US011136010B2

(12) United States Patent
Suzuki

(10) Patent No.: US 11,136,010 B2
(45) Date of Patent: Oct. 5, 2021

(54) MOTOR WITH A CONE CLUTCH MOTOR BRAKE

(71) Applicant: AKEBONO BRAKE INDUSTRY CO., LTD, Tokyo (JP)

(72) Inventor: Michio Suzuki, Walled Lake, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 324 days.

(21) Appl. No.: 16/269,718

(22) Filed: Feb. 7, 2019

(65) Prior Publication Data

US 2019/0256060 A1    Aug. 22, 2019

Related U.S. Application Data

(60) Provisional application No. 62/632,457, filed on Feb. 20, 2018.

(51) Int. Cl.
| | |
|---|---|
| B60T 1/06 | (2006.01) |
| F16D 55/225 | (2006.01) |
| F16D 65/18 | (2006.01) |
| F16D 15/00 | (2006.01) |
| F16D 121/04 | (2012.01) |
| F16D 129/10 | (2012.01) |
| F16D 125/40 | (2012.01) |
| F16D 127/06 | (2012.01) |
| F16D 129/08 | (2012.01) |

(Continued)

(52) U.S. Cl.
CPC .............. *B60T 1/065* (2013.01); *F16D 15/00* (2013.01); *F16D 55/225* (2013.01); *F16D 65/18* (2013.01); *F16D 65/183* (2013.01); *F16D 2121/04* (2013.01); *F16D 2121/14* (2013.01); *F16D 2121/24* (2013.01); *F16D 2125/40* (2013.01); *F16D 2127/06* (2013.01); *F16D 2129/08* (2013.01); *F16D 2129/10* (2013.01)

(58) Field of Classification Search
CPC ........ B60T 1/065; F16D 65/18; F16D 65/183; F16D 55/225; F16D 55/226; F16D 2121/04; F16D 2121/24; F16D 2125/06; F16D 2125/36; F16D 2125/40
See application file for complete search history.

(56) References Cited

U.S. PATENT DOCUMENTS

| | | | |
|---|---|---|---|
| 5,915,504 A * | 6/1999 | Doricht ................... | B60T 8/321 188/72.1 |
| 7,673,949 B2 * | 3/2010 | Kuramochi ............. | B60T 8/885 303/122.03 |

(Continued)

*Primary Examiner* — Vishal R Sahni
(74) *Attorney, Agent, or Firm* — The Dobrusin Law Firm, P.C.; Bryan S. Lemanski

(57) ABSTRACT

A brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor; and (b) a motor brake that prevents movement of the motor gear unit, the pistons, or both when the motor is turned off so that a brake apply is maintained, the motor brake including: (i) housing; (ii) an engaging element; (iii) a sleeve, and (iv) a solenoid that is in communication with the sleeve so that when the solenoid moves the sleeve, the engaging element is moved into contact with the housing creating a braking force.

18 Claims, 6 Drawing Sheets

(51) Int. Cl.
*F16D 121/14* (2012.01)
*F16D 121/24* (2012.01)

(56) References Cited

U.S. PATENT DOCUMENTS

| | | | | |
|---|---|---|---|---|
| 9,333,953 | B2* | 5/2016 | Masuda | B60T 7/12 |
| 9,341,222 | B2* | 5/2016 | Masuda | F16D 66/00 |
| 10,518,761 | B2* | 12/2019 | Thomas | H02K 7/06 |
| 2003/0042084 | A1* | 3/2003 | Kawase | F16D 55/00 |
| | | | | 188/72.1 |
| 2005/0082908 | A1* | 4/2005 | Klode | B60T 13/02 |
| | | | | 303/20 |
| 2005/0173206 | A1* | 8/2005 | Reuter | F16D 65/18 |
| | | | | 188/72.7 |
| 2005/0279592 | A1* | 12/2005 | Shaw | F16D 65/18 |
| | | | | 188/163 |
| 2011/0100768 | A1* | 5/2011 | Baumgartner | F16D 65/568 |
| | | | | 188/72.2 |
| 2017/0058979 | A1* | 3/2017 | Bahmata | F16D 55/226 |
| 2018/0087590 | A1* | 3/2018 | Chelaidite | F16D 65/183 |

\* cited by examiner

MOTOR WITH A CONE CLUTCH MOTOR BRAKE

FIELD

The present teachings generally relate to a motor brake for a motor and particularly to a high efficiency electric brake that includes a cone clutch to prevent back drive of the motor and high efficiency solenoid brake when the parking brake is applied.

BACKGROUND

Vehicle brake systems typically have a service brake (e.g., hydraulic) that has service brake apply modes and a parking brake system that has parking brake apply modes (e.g., manual). During a service brake apply hydraulic pressure is applied to a piston that moves the piston. In recent systems, during a parking brake apply an electric motor and drive mechanism moves the piston to create the parking brake apply. Once the parking brake apply is complete the motor is turned off. Typically, worm gear or some other threaded member (e.g., lead screw) is located between the piston and the motor, which prevents the piston from back driving the mechanism and motor.

Examples of some brake assemblies and/or motor brakes may be found in U.S. Pat. Nos. 2,052,846; 2,823,325; and 6,435,320 and International Patent Application Publication No. WO03/027528 all of which are incorporated by reference herein for all purposes. It would be attractive to have a motor brake that prevents back drive of a motor when the motor is turned off. What is needed is motor brake that prevents back drive of the drive mechanism when the brake pads are compressed by a drive mechanism such as a high efficiency rotary to linear actuator (e.g., ball screw or ball ramp). What is needed is an solenoid motor brake that when activated causes contact between two movable parts so that back rotation of the motor is prevented. It would be attractive to have a motor brake with a cone clutch that prevents rotation of the motor when the solenoid is actuated.

SUMMARY

The present teachings meet one or more of the present needs by providing: a brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor; and (b) a motor brake that prevents movement of the motor gear unit, the pistons, or both when the motor is turned off so that a brake apply is maintained, the motor brake including: (i) housing; (ii) an engaging element; (iii) a sleeve, and (iv) a solenoid that is in communication with the sleeve so that when the solenoid moves the sleeve, the engaging element is moved into contact with the housing creating a braking force.

The present teachings meet one or more of the present needs by providing: a brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor; and (d) a motor brake that prevents movement of the motor gear unit, the pistons, or both when the motor is turned off so that a brake apply is maintained, the motor brake including: (i) housing; (ii) an engaging element that is movable into contact with the housing; (iii) a plate; (iv) a sleeve that extends between the engaging element and the plate, and a portion of the engaging element extending into the sleeve; (v) a plurality of balls located between the plate and the engaging element; and (vi) a solenoid that is in communication with the sleeve so that when the solenoid moves the sleeve the plurality of balls are moved along the engaging element, and the engaging element is moved into contact with the housing creating a braking force.

The present teachings provide a motor brake that prevents back drive of a motor when the motor is turned off. The present teachings provide a motor brake that prevents back drive of the drive mechanism when the brake pads are compressed by a drive mechanism such as a high efficiency rotary to linear actuator (e.g., ball screw or ball ramp). The present teachings provide a solenoid motor brake that when activated causes contact between two movable parts so that back rotation of the motor is prevented. The present teachings provide a motor brake with a cone clutch that prevents rotation of the motor when the solenoid is actuated.

DETAILED DESCRIPTION

Figure 1:
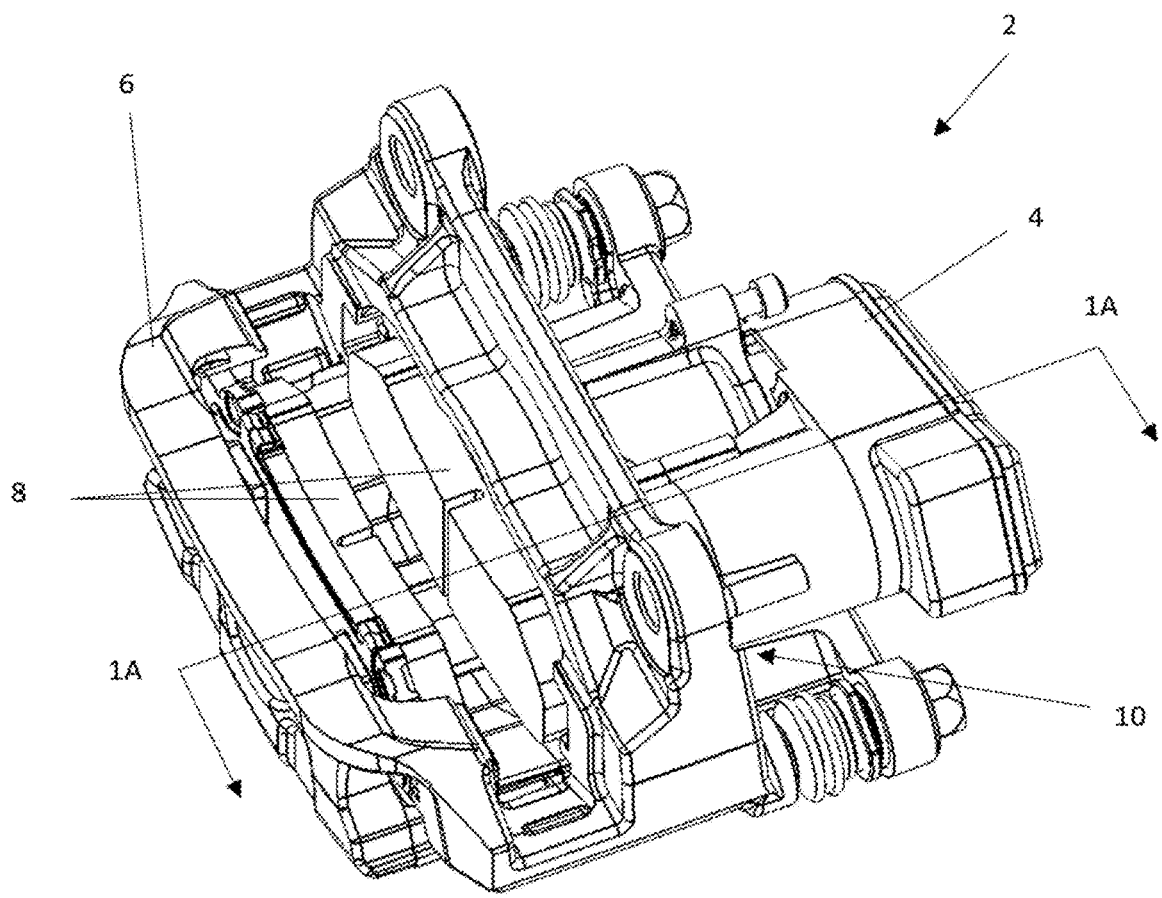
FIG. 1 is a perspective view of a brake assembly.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake assembly including a motor with a motor brake and preferably a solenoid motor brake, a cone clutch motor brake, or both that maintains a parking brake apply. The brake assembly may be a floating caliper assembly, a fixed caliper assembly, a single piston assembly, a multi-piston assembly, a drum brake, or a combination thereof. Preferably, the brake assembly is a floating caliper or fixed caliper. The brake assembly may include a support bracket that connects a caliper to a machine (e.g., automobile, truck, wind turbine, paper machine). Preferably, the support bracket connects a caliper to a knuckle of a vehicle. The brake assembly may be free of a support bracket. The brake assembly be free of a caliper. The brake assembly may include one or more pistons, one or more piston bores, a plurality of pistons, a plurality of piston bores, or a combination thereof. The brake assembly may include hydraulic fluid under pressure that moves a piston axially into contact with a brake pad to create a brake apply. The hydraulic pressure in the piston bore may be released when the brake apply is complete so that an air gap is created and the piston retracts. The caliper may house the pistons, be connected to one or more motors, or a combination thereof that move brake pads or brake shoes to create a braking force.

The brake pads or brake shoes (i.e., brakes) may function to contact a moving object and slow or stop the moving object. The brakes may contact a rotor or a drum. The brake pads or brake shoes function to create friction that stops or slows an object or maintains the object (such as a vehicle) at rest. The brake pads include friction material and a backing plate. The brake pads may be moved into contact with a rotor. The brake shoes may be moved into contact with a drum or a hat of a rotor. The brake pads or brake shoes may be moved axially by one or more pistons.

The one or more pistons function to axially move the one or more brake pads or brake shoes. The one or more piston may be hydraulically moved, mechanically moved (e.g., by an electric motor), or both. The one or more pistons may be hydraulically moved during a service brake apply and mechanically moved during a parking brake apply. The one or more pistons may be made of metal or a phenolic. The one or more pistons may be moved by a rotary to linear actuator, a hydraulic fluid, or both. The one or more pistons may move along a piston bore in a caliper to create a service brake apply, a parking brake apply, or both.

The one or more calipers may function to assist in creating a brake apply. The one or more calipers may support one or more pistons so that the pistons may be moved to create a brake apply, a parking brake apply, or both. The calipers may axially move in an opposite direction to the pistons. The calipers may be static. The caliper includes one or more piston bores that each house a piston. The piston bores may include all or a portion of a rotary to linear actuator. The rotary to linear actuator may extend into the piston, which is located within the piston bore. The caliper may be connected to one or more motor gear units, one or more motors, or both.

The one or more motor gear units may each move one or more pistons, two or more pistons, four or more pistons, or even six or more pistons. The one or more motor gear units function to mechanically move a piston to create a parking brake apply. The motor gear unit may function to move a high efficiency rotary to linear actuator (e.g., ball ramp, or ball screw) to create a brake apply. High efficiency as discussed herein is rolling friction (e.g. a ball or cylinder). High efficiency as discussed herein is not sliding friction. The high efficiency rotary to linear actuator may be a high efficiency spindle. The motor gear unit may be a combination of a motor and gears. The gears may reduce the rotation speed of the motor or increase torque to create a parking brake apply. The motor gear unit may include one or more motors. The motor gear units may include a gear reduction assembly, a planetary gear assembly, gears that increase torque or speed, gears that decrease torque or speed, or a combination thereof. The one or more gears may be connected to one or more motor shafts that output torque to a piston, a rotary to linear actuator, a high efficiency device such as a rotary to linear actuator, or a combination thereof. The motor gear unit is in communication with one or more motors. Preferably, the motor gear unit includes one or more motors.

The one or more motors may function to apply torque when power is applied to the motors. The one or more motors may function to rotate one or more gears, a rotary to linear actuator, a ball screw, a ball ramp, a lead screw, a gear, a differential, or a combination thereof. The one or more motors may function to create a parking brake apply. The one or more motors may be an electric motor. The one or more motors may move a piston during a parking brake apply and hydraulic fluid may move a piston during a service brake apply. Hydraulic fluid may assist the motor in creating a parking brake apply or vice versa. The one or more motors include one or more motor shafts that assist in moving a piston, moving a rotary to linear actuator, or a combination thereof.

The one or more motor shafts may function to receive a braking force, apply torque, rotate a rotary to linear actuator, apply torque to a differential assembly, move one or more pistons, prevent back drive of a piston, or a combination thereof. The one or more motor shafts may be located at a distal end of the motor, a proximal end of the motor, or both. The motor shafts may extend out of the motor and communicate a force to one or more components of a brake assembly to create a braking force, a parking brake force, a service braking force, or a combination thereof. The motor on one end may include a motor shaft that moves a piston and a second motor shaft that is in communication with a motor brake that prevents movement of the motor when the motor is turned off.

The motor brake functions to brake the motor when the motor is off so that a brake apply is maintained. The motor brake functions to be a brake on a motor so that a position of a motor is maintained while the motor is off. The motor brake functions to maintain a set position of a motor so that the motor prevents brake pads or brake shoes from moving and releasing or relaxing a braking force. Preferably the motor brake is a solenoid brake, a cone clutch motor brake, or both. The motor brake may be released when the motor is turned on so that the motor brake does not provide a braking function. The motor brake may have a portion that rotates with the motor shaft when the motor is active, the motor is on, or both. For example, a motor gear, a housing, or both may rotate with the motor shaft. The motor brake may be applied when the motor is turned off so that the motor brake prevents rotation of the motor shaft, gear system, or both. The motor brake may be connected directly to the motor or the motor shaft. The motor brake may be located within a housing that is grounded to the motor, a caliper, a brake assembly, or a combination thereof so that rotation of the motor brake is prevented and the motor brake can ground the motor. The motor brake may include one or more motor gears that are directly connected to the motor shaft or indirectly connected to the motor shaft through one or more intervening gears.

The one or more motor gears function to connect the motor brake to the motor so that the motor brake can prevent movement of the motor when the motor is off. The motor gears may transmit torque or prevent transmission of torque to the motor when the motor is off. The motor gears may rotate with the motor when the motor is on. The motor gears may rotate with one or more motor gear units when the motor is on and prevent movement of the one or more motor gear units when the motor is off. The motor gear may include one or more teeth for transmitting or receiving rotational force. The motor gears may rotate relative to a housing when the motor is operating. The motor gears may rotate about a shaft that is connected to a housing. The one or more motor gears may be connected to a shaft, in communication with one or more bearings, or both that assist in rotating the motor gear.

The one or more bearings function to allow rotation of the motor hear relative to a housing, an engaging element, or both. The one or more bearings may prevent a transfer of rotational motion from one part to a second part. The one or more bearings may be a thrust bearing, a radial bearing, or both. The one or more bearings may be located on each side of a housing so that the housing remains stationary and the motor gear rotates about the housing. The one or more bearings may allow the housing to rotate with the motor, the motor gear, or both and a solenoid, a engaging element, or both to remain rotationally stationary. A bearing may be connected to a first side of a housing, a bearing may be connected to a second side of a housing, or both. Preferably, the housing is sandwiched between two bearings.

The one or more housings may function to rotate with the gear, provide a contact surface to prevent rotation of the gear, create a friction surface for the engaging element to contact, or a combination thereof. The housing may rotate with the one or more gears. The housing may be integrally connected to the motor gear. The housing and the motor gear may be separate pieces and be locked together to rotate together. The housing may rotate relative to the solenoid, the engaging element, or both. The housing may act as a drum, a rotor, or both that rotates with the motor and then prevents movement of the motor when contacted by the engaging element that acts as a brake pad. The housing may have a linear portion adjacent to a tapered surface that assists in creating a friction force. The linear portion may be perpendicular to a rotational axis. The housing may have an engagement side and a non-engagement side. The non-engagement side may face the motor. The engagement side may face the solenoid. The housing may have a cross section that is partially "U" shaped so that a portion of the engaging element fits within the housing. The housing may have one or more shoulders, one or more protrusions, or both that contact one or more bearings. The housing may have a protrusion that extends outward so that a bearing can connect to the housing.

The one or more protrusions may function to receive a shaft, connect to a bearing, or both. The one or more protrusions may extend towards the solenoid. The one or more protrusions may extend away from the solenoid. The one or more protrusions may create a shoulder that prevents axial movement of the bearing. The one or more protrusions may be located on a top of the housing, a bottom of the housing, or both. The one or more protrusions may be located within the housing and covered by one or more tapered surfaces. The one or more protrusions may extend from a center of the housing. The one or more protrusions may extend cantilever from the housing. The one or more protrusions may extend into a center of a bearing. The one or more protrusions may be concentrically located within a tapered surface of a housing.

The one or more tapered surfaces of the housing function to create friction, stop a motor, prevent motion of the motor, or a combination thereof. The one or more tapered surfaces may increase friction relative to other components of the motor brake (e.g., an engaging element or an engaging portion). The one or more tapered surfaces may assist an engaging element in entering into and contacting a housing. The one or more tapered surfaces may increase friction as the engaging elements are moved into contact with the housing. The tapered surface may be chamfered, angled, may include one or more tapers, two or more tapers, or a combination thereof. Preferably, the tapered surface is a single angled surface that decreases in diameter as the tapered surface extends towards the gear. The tapered surface may contact an engaging portion of an engaging element.

The engaging element may function to be moved into contact with the housing so that the engaging element creates a friction force, prevents movement of the piston, the brake, the motor, or a combination thereof. The engaging elements may move axially. The engaging elements may be axially moved by one or more balls as the solenoid axially moves a shaft. The one or more engaging elements may move in an opposite direction as the solenoid shaft. The one or more engaging elements may have a conical portion that contacts the one or more balls on a first end and an engaging portion that contacts the housing or the tapered surface of the housing to create a friction force.

The one or more conical portions may function to axially move the engaging element. The one or more conical portions may contact one or more balls (i.e., ball bearings) that axially move the engaging element. The one or more conical portions may have a triangular cross-sectional shape. The one or more conical portions may be a cone shape. The one or more conical portions may have a peak and as the balls move towards the peak the engaging element may be axially moved away from the solenoid and as the balls move away from the peak the engaging element may move towards the solenoid. The one or more conical portions may be a portion of the engaging element that moves the engaging portion into the housing, into contact with the tapered surface, into contact with a linear surface, or a combination thereof.

The one or more engaging portions function to contact the housing and prevent rotation of the housing, the motor gear, the motor, the pistons, or a combination thereof. The one or more engaging portions may axially move into contact with the housing, the tapered portions, or both. The one or more engaging portions may be complementary in shape with the housing, the tapered portions, or both. The one or more engaging portions may be any portion of the engaging element that contacts the housing, that creates a friction force, or both. The one or more engaging portions may have a tapered shape that mirrors the shape of the tapered surface. The one or more engaging portions may include one or more friction surfaces.

The one or more friction surfaces may function to create a sufficient coefficient of friction so that the housing is prevented from moving when the engaging element is on contact with the housing. The one or more friction surfaces may be made of the same material as the engaging element. The one or more friction surfaces may have a coating, be roughened, include one or more contours, or a combination thereof. The one or more friction surfaces may be made of a different material than the engaging element, the engaging portion, or both. The one or more friction surfaces may be located on an outer circumference of the engaging portion. The friction surface may extend around an outside of a portion of the engaging element and a cavity may be located inside of the engaging friction surface.

The one or more cavities may function to receive all or a portion of a bias member. The one or more cavities may prevent a bias member from moving as the engaging element is moved between a brake on position and a brake off position. The one or more cavities may retain the bias member within the engaging element when the engaging element is in a static position. The one or more cavities may receive one or more bias members.

The one or more biasing members function to move the engaging element to a home position (e.g., a non-braking position) when the motor brake is released. The one or more biasing members may move an engaging element away from a housing. The one or more biasing members may extend around a portion of a protrusion. The one or more biasing members may be located between a bearing, the housing, or both and the engaging element. The one or more biasing members may axially move the engaging element when the solenoid is off. The one or more biasing members may be a compression spring, an elastomeric material, rubber, a tension spring, or a combination thereof. The one or more biasing members may extend over or around a cavity of the engaging element.

The cavity of the engaging element functions to receive a portion of a protrusion so that the engaging element and the housing can move relative to each other. The cavity may receive all or a portion of the protrusion. The protrusion may extend into the cavity and the cavity may limit axial movement of the engaging element relative to the housing. The cavity may extend into the protrusion such that the protrusion receives all or a portion of the cavity. The cavity and protrusion may form a complementary fit. The cavity may be part of the housing and the protrusion may be part of the engaging element. The cavity and protrusion may complementarily fit one another so that as the balls axially move the engaging element the housing and the engaging element remain aligned. The cavity and protrusion may axially align the engaging element with the housing and a track within the engaging element may maintain the one or more balls in contact with the conical portion.

The one or more tracks may function to prevent the one or more balls from moving into contact. The one or more tracks may function as a race to retain the balls in a position relative to the base, the conical portion, or both. The one or more tracks may be a groove that the balls ride within. The track may extend from a center towards an outer diameter, an outer circumference or both of the engaging element, the conical portion, or both. The one or more tracks may be sufficiently deep to maintain the balls within the track while the tracks assist in axially move the engaging element. The one or more tracks may be sufficiently wide to prevent lateral movement of the balls out of the track as the engaging element moves axially. The one or more tracks may extend from a center of the conical portion to an outside of the engaging portion and then up a wall of the engaging portion. Each of the one or more tracks may receive one or more or more balls and preferably one ball.

The one or more balls may function to move along the engaging element, the conical portion, the base, or a combination thereof to create a motor brake on position, a motor brake off position, or both. The one or more balls may be a roller bearing. The one or more balls may be spherical, cylindrical, or both. The one or more balls may rotate in one or more directions, two or more directions, or both. The one or more balls may travel around a longitudinal axis, a rotational axis, or both. The one or more balls may travel along a conical portion. The one or more balls may travel towards an apex. The one or more balls may travel from a center of a the conical portion to an outside of a conical portion or a circumference, or vice versa. For example, during a motor brake, braking event the balls may move towards a center of the conical portion so that the conical portion is axially moved into contact with the housing. In another example, when the motor is turned on, the solenoid is retracted and the balls move from a center of the conical portion outward towards an outer dimeter or circumference of the conical portion so that the conical portion axially moves the engaging element away from the housing, releasing the motor brake. The one or more balls when moved outward may create gap between the engaging portion and the tapered portion so that a brake apply is not created. The one or more balls may move inward as the sleeve is axially moved away from the housing so that a gap is created between the sleeve and the leg and a braking force is created.

The gap may function to create a space between to complementary parts that create a friction force relative to each other. During a brake retract of the motor brake a gap may be created between the tapered surface and the engaging portion. During a brake apply a gap may be located between the sleeve and the plate, the leg, the base, or a combination thereof. During a brake apply of the motor brake the gap may be located between the plate, the leg, or both and the sleeve. During rotational movement of the motor brake (i.e., brake off) the gap may be located between the tapered surface and the engaging portion, the engaging element and the housing, or both. The gap may be sufficiently large so that the housing rotates relative to the engaging element. The gap may change locations as the elements move relative to each other. For example, in the brake off position the gap may be located between the friction surface and the tapered surface, and in the brake on position the gap may be located between the sleeve and the plate. The gap may be about 0.001 mm or more, about 0.002 mm or more, or about 0.005 mm or more. The gap may be about 0.5 mm or less, about 0.02 or less, or about 0.1 mm or less. The gap may be sufficiently large so that when the engaging element rotates relative to the housing the engaging element and the housing are free of contact. As the gap between the sleeve and the plate increases the balls may be moved inward towards a center of the conical portion so that the engaging element is axially moved.

The one or more sleeves may function to axially and to move the one or more balls towards a center and away from the center so that a friction force is created. The one or more sleeves may move one or more balls inward towards a center of the engaging portion and allow the one or more balls to move outward away from the center. The one or more sleeves may be axially moved by a biasing member, movement of the solenoid, or both. The one or more sleeves may include a portion that is located above a plate and a portion that is located below a plate. The one or more sleeves may be connected to a solenoid by one or more pins. The one or more sleeves may be directly connected to the solenoid. As the sleeves move in a first direction the engaging element moves in a second direction. The one or more sleeves may cause the balls to move towards each other. As the one or more sleeves extend towards the housing, the one or more balls may move apart from each other. The sleeve may include one or more windows that move towards an away from a base.

The one or more windows may function to extend the sleeve around the plate so that the sleeve is in communication with the solenoid and the solenoid may axially move the sleeve. The one or more windows may permit the sleeve to axially move without interference by the plate, the solenoid, or both. The one or more windows may allow the sleeve to be located on a first side and a second side of the plate. The one or more windows may receive one or more legs of the plate, one or more arms of the solenoid, or both. The one or more windows may extend around the plate so that the sleeve is in communication with the solenoid and the solenoid may axially move the sleeve. The sleeve may include one or more windows, two or more windows, three or more windows, or even four or more windows. The sleeve may include windows that are located apart by about 45 degrees or more, about 90 degrees or more, about 135 degrees or more, or even about 180 degrees. The windows may be located about 180 degrees apart or less, about 135 degrees apart or less, or about 115 degrees apart or less. The one or more windows may allow a portion of the solenoid, a plate, or both to extend through the sleeve while a retaining feature is connected to a bias feature.

The one or more retaining features may function to prevent the sleeve from being removed from the solenoid. The one or more retaining features may function to prevent the solenoid and the housing from being separated. The one or more retaining features may be connected to the solenoid by a pin, located on an underside of a plate, or both. The one or more retaining features may form a second side of a window. The one or more retaining features may restrict movement of the sleeve by the retaining features contacting a plate during a brake apply of the motor brake. The retaining features may contact the plate to restrict movement of the sleeve, the engaging element, or both so that during motor braking the housing is not damages from over extension of the engaging element. A gap may be present between the retaining feature and the plate when the motor brake is being applied. The retaining features may be in contact with the leg or have a gap that is less than the gap when the motor brake is being applied when the motor brake is in a brake off position. As the retaining feature moves in a brake apply direction (e.g., away from the plate) the bias feature may be moved into contact with the balls.

The bias feature functions to move the balls during a brake apply so that movement of the balls move the friction surface into contact with the tapered surface. The bias feature may reduce restriction of the balls during a brake release so that the balls move apart and the friction surface moves away from the tapered surface. The bias features may be angled so that the balls move towards a center as the bias features restrict the balls. The bias features may have a sufficient angle so that as the bias features move the balls towards each other the conical portion moves the friction surface into contact with the tapered surface. The bias feature may be an annular angle that restricts movement of all of the balls simultaneously so that as the balls travel along an angle of the conical portion the engaging element is axially moved. The bias feature may have an angle of about 5 degrees or more, about 10 degrees or more, about 15 degrees or more, about 25 degrees or more, or even about 45 degrees or more. The bias feature may have an angle of about 90 degrees or less, about 75 degrees or less, or about 60 degrees or less. As the bias feature moves towards a brake off position the bias feature will stop restricting the balls and the conical portion may apply a force on the balls so that the balls move away from each other. The biasing member push the conical portion against the balls and the balls against the bias feature and the bias feature may restrict the axial movement. The bias feature may be axially moved by the solenoid. The solenoid may be connected to the sleeve, the bias feature of the sleeve, or both by one or more pins so that the bias feature restricts and releases the balls.

The one or more pins may function to move the sleeve. The one or more pins may form a removable connection between the sleeve and the solenoid. The one or more pins may extend from a first side of the sleeve to the second side of the sleeve. The one or more pins may be threaded, connected by a locking pin, connected by a set screw, be welded, glued, flared, or a combination thereof so that the pin connects the sleeve to the solenoid.

The one or more solenoids function to create axial movement so that the motor brake is applied or turned off. The one or more solenoids may create movement by a hydraulic force, pneumatic force, electricity, one or more gears, or a combination thereof. The one or more solenoids may include an electric motor. The one or more solenoids may include one or more magnets. The one or more solenoids may include one or more cylindrical coils of wire tat act as a magnet when electrical energy is applied. The one or more solenoids may be electromechanically operated. The one or more solenoids may include one or more shafts that are axially moved so that the one or more shafts axially move the engaging element, the sleeve, or both.

The one or more shafts may function to connect the solenoid to the sleeve. The one or more shafts may extend into and out of the solenoid. The one or more shafts may be an externally moving part of the solenoid. An amount of shaft extending out of the solenoid may vary as the solenoid moves that motor brake between a brake on and a brake off. The shaft may extend out of the solenoid and connect to a sleeve by one or more pins. The one or more shafts may be axially movable upon activation of the solenoid. The one or more shafts may extend through a center of the solenoid and one or more arms may extend outwardly away from the shaft of the solenoid.

The one or more arms may function to connect the solenoid to a plate, a sleeve, or both. The one or more arms may extend from one or more sides, two or more side, three or more sides, or four or more sides. The one or more arms may be a single annular arm that extends around the solenoid. The one or more arms may function to connect the solenoid to a plate so that the solenoid may create a braking force. The one or more arms may extend through the one or more windows in the sleeve. The one or more arms may have a circumference that is greater than the circumference of the solenoid. The one or more arms may include one or more holes, connection features, or both that may connect the arms to the one or more plates.

The one or more plates may function to connect the solenoid to a housing, an engaging element, a sleeve, or a combination thereof. The one or more plates may extends through one or more windows in one or more sleeves. The one or more plates may connect the sleeve to the one or more arms of the solenoid. The one or more plates may include one or more holes, one or more legs, one or more base portions, or a combination thereof.

The one or more legs may connect to the one or more plates to the one or more arms. The one or more legs may be complementary in shape to the one or more arms. The one or more legs may include one or more holes, connection features, or both that mirror one or more holes, connection features, or both in the one or more arms so that the one or more arms and the one or more legs are connected together. The one or more legs may be an annular ring. The one or more legs may extend through one or more windows in the sleeve. When more than one leg is present the legs may extend outward from a base of the plate.

The base may function to guide a shaft of the plate, support one or more legs, support one or more balls, or a combination thereof. The one or more balls and preferably the plurality of balls are supported on the base. The balls may be supported by the base and the shaft may extend through the base. The base may be located above the arms and the legs. The base may be generally "U" shaped or "C"

shaped and the legs may extend radially outward from the base. The base may be static during movement of the shaft, actuation of the motor brake, or both.

FIG. 1 illustrates a brake assembly 2. The brake assembly 2 includes a motor gear unit 4 and a caliper 6. The caliper 6 has a pair of opposing brake pads 8 that are moved by a piston 10 sliding inside a piston bore (not shown) within the caliper 6. During hydraulic operation the piston movement is caused by hydraulic pressure, and during an electric brake apply, movement is caused by the motor gear unit 4 and a rotary to linear actuator (not shown).

Figure 1A:
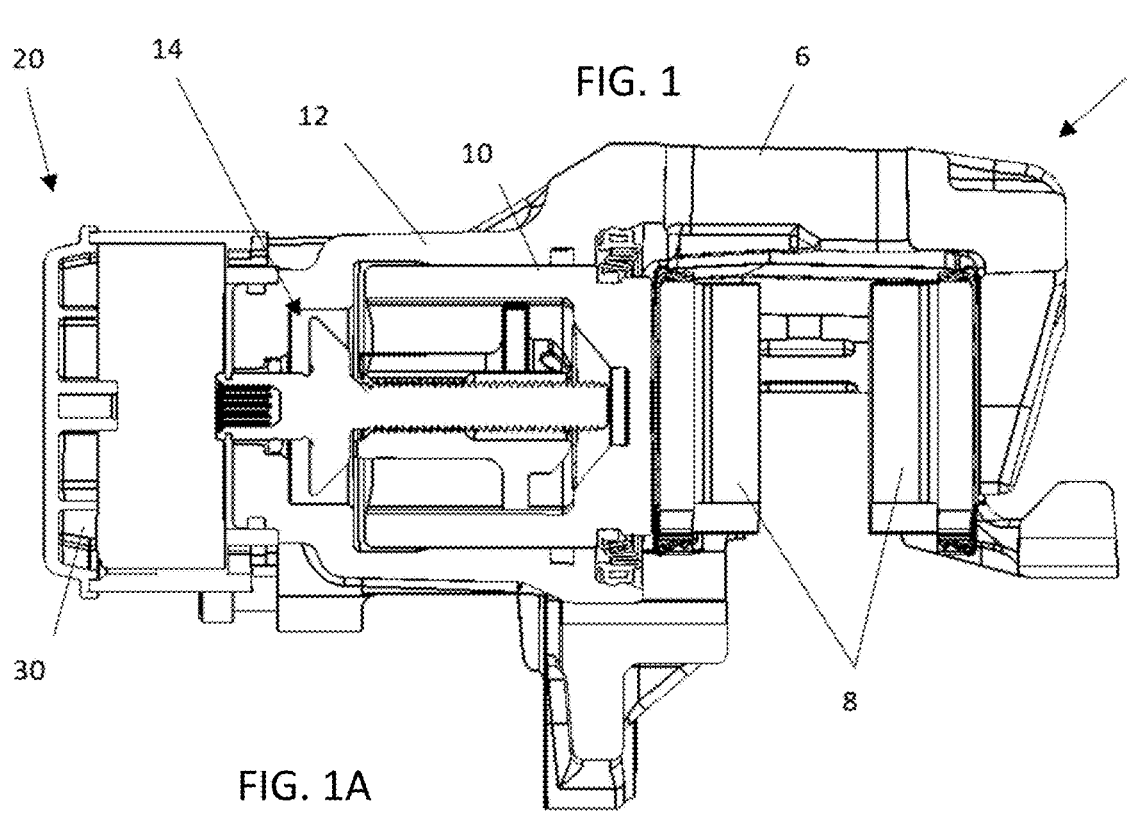
FIG. 1A is a cross-sectional view of the brake assembly of FIG. 1.

FIG. 1A is a cross-sectional view of the brake assembly 2 of FIG. 1. The brake assembly 2 includes a caliper 6 with a pair of opposing brake pads 8. One of the brake pads 8 is in contact with a piston 10. The piston 10 is located within a piston bore 12. The piston bore 12 includes hydraulic fluid (not shown) that moves the piston 10 when fluid pressure is increased, and a rotary to linear actuator 14 that electrically moves the piston 10 when the motor 20 is turned on. The motor 20 includes a motor brake 30.

Figure 2:
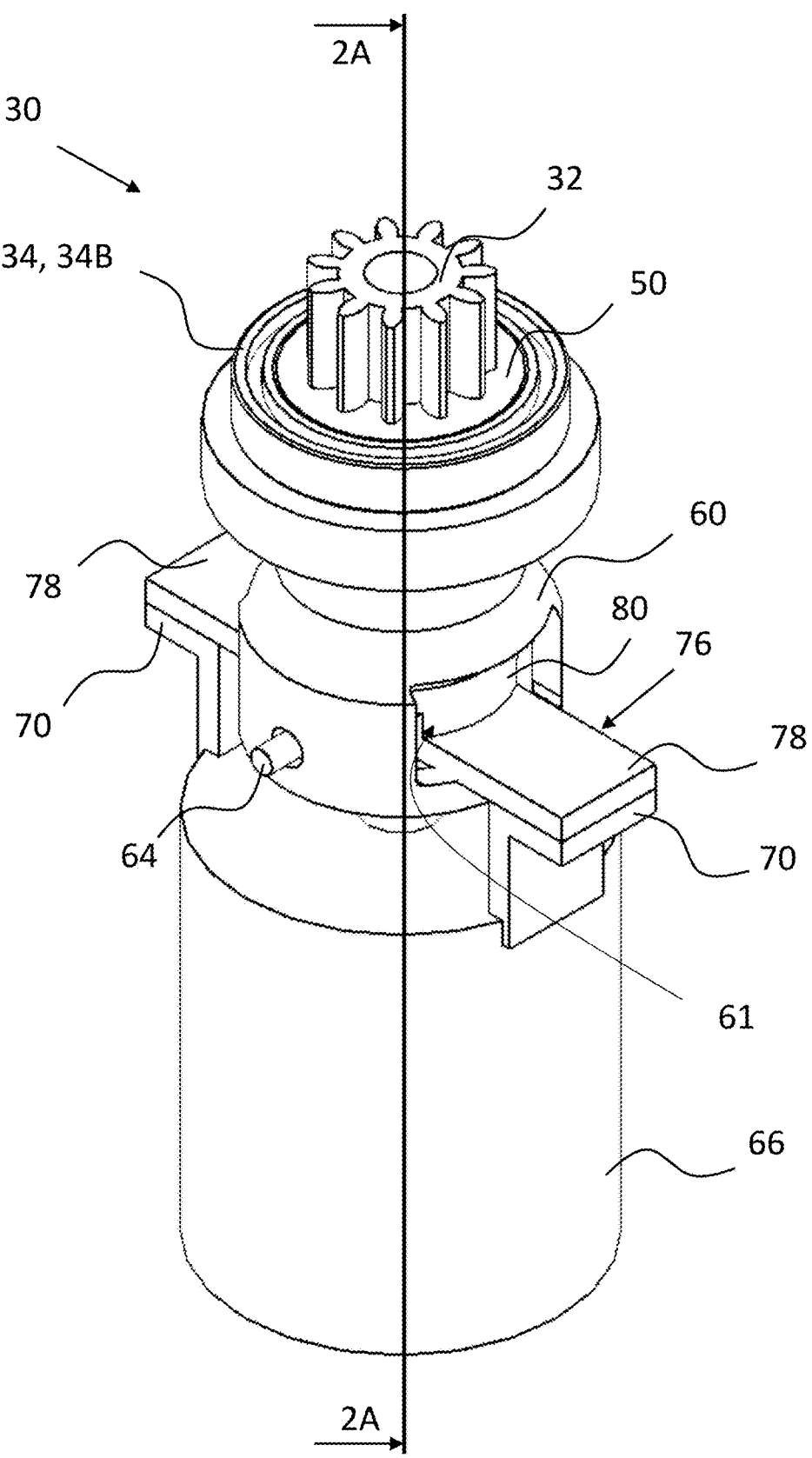
FIG. 2 is a perspective view of a motor brake.

FIG. 2 illustrates a perspective view of a motor brake 30. The motor brake 30 includes a solenoid 66. A plurality of arms 70 of the solenoid 66 are connected to a plurality of legs 78 of a plate 76. A sleeve 60 includes a window 61 so that the sleeve 60 is positioned around the legs 78 of the plate 76 is movably connected to the solenoid 66 via a pin 64. When the solenoid 66 moves the sleeve 60, a base 80 of the plate 76 shifts a plurality of balls into an engaging element located within the sleeve 60 (see FIGS. 2-4). As the plurality of balls contacts the engaging element, the engaging element then engages an interior tapered surface of a housing 50 integrally formed with a motor gear 32 (see FIGS. 2-4). The motor gear 32 directly or indirectly connects to a motor of the brake assembly so that, when the motor brake 30 is engaged, the motor gear 32 is prevented from rotating (see FIGS. 1 and 2). The motor brake 30 further includes a radial bearing 34B that encompasses a top portion of the housing 50 and engages a surface of the motor or secondary attachment.

Figure 2A:
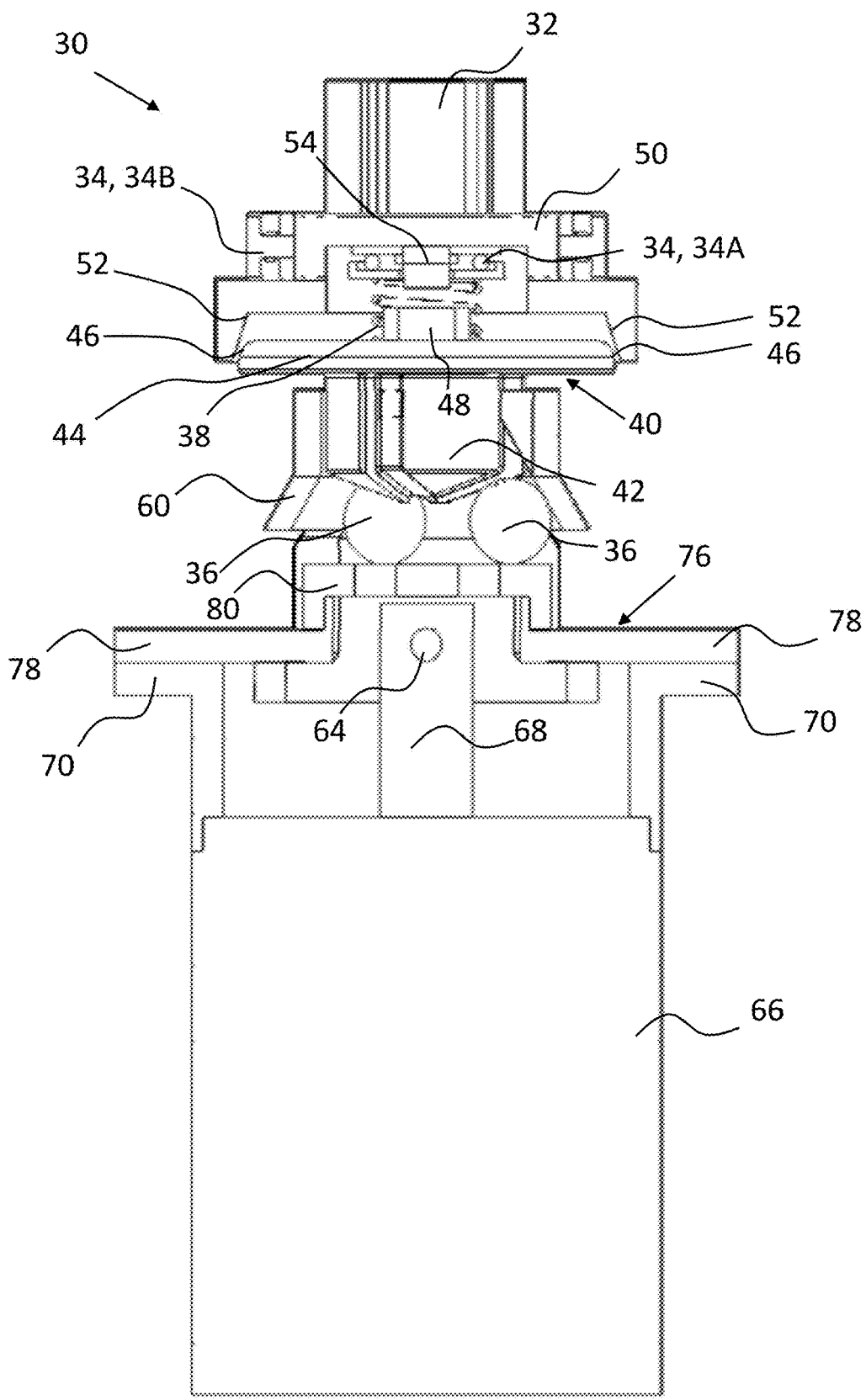
FIG. 2A is a cross-sectional view of the motor brake of FIG. 2.

FIG. 2A illustrates a cross-sectional view of the motor brake 30 of FIG. 2. The motor brake 30 includes a solenoid 66. A plurality of arms 70 of the solenoid 66 are connected to a plurality of legs 78 of a plate 76. A sleeve 60 positioned around the legs 78 of the plate 76 is movably connected to a shaft 68 of the solenoid 66 via a pin 64. When the solenoid 66 moves the sleeve 60, a base 80 of the plate 76 shifts a plurality of balls 36 towards or away from an engaging element 40 located within the sleeve 60 to engage or disengage the motor brake 30. When the plurality of balls 36 contacts a conical portion 42 of the engaging element 40 in an engaging position, a friction surface 46 along an engaging portion 44 of the engaging element 40 contacts an interior tapered surface 52 of a housing 50 integrally formed with a motor gear 32. When the friction surface 46 contacts the tapered surface 52 of the housing 50, a biasing member 38 is compressed so that a protrusion 54 of the housing 50 surrounded by a thrust bearing 34A is received by a cavity 48 of the engaging element 40. The motor gear 32 directly or indirectly connects to a motor of the brake assembly so that, when the motor brake 30 is engaged, the motor gear 32 is prevented from rotating (see FIGS. 1 and 2). The motor brake 30 further includes a radial bearing 34B that encompasses a top portion of the housing 50 and engages a surface of the motor or secondary attachment.

Figure 3:
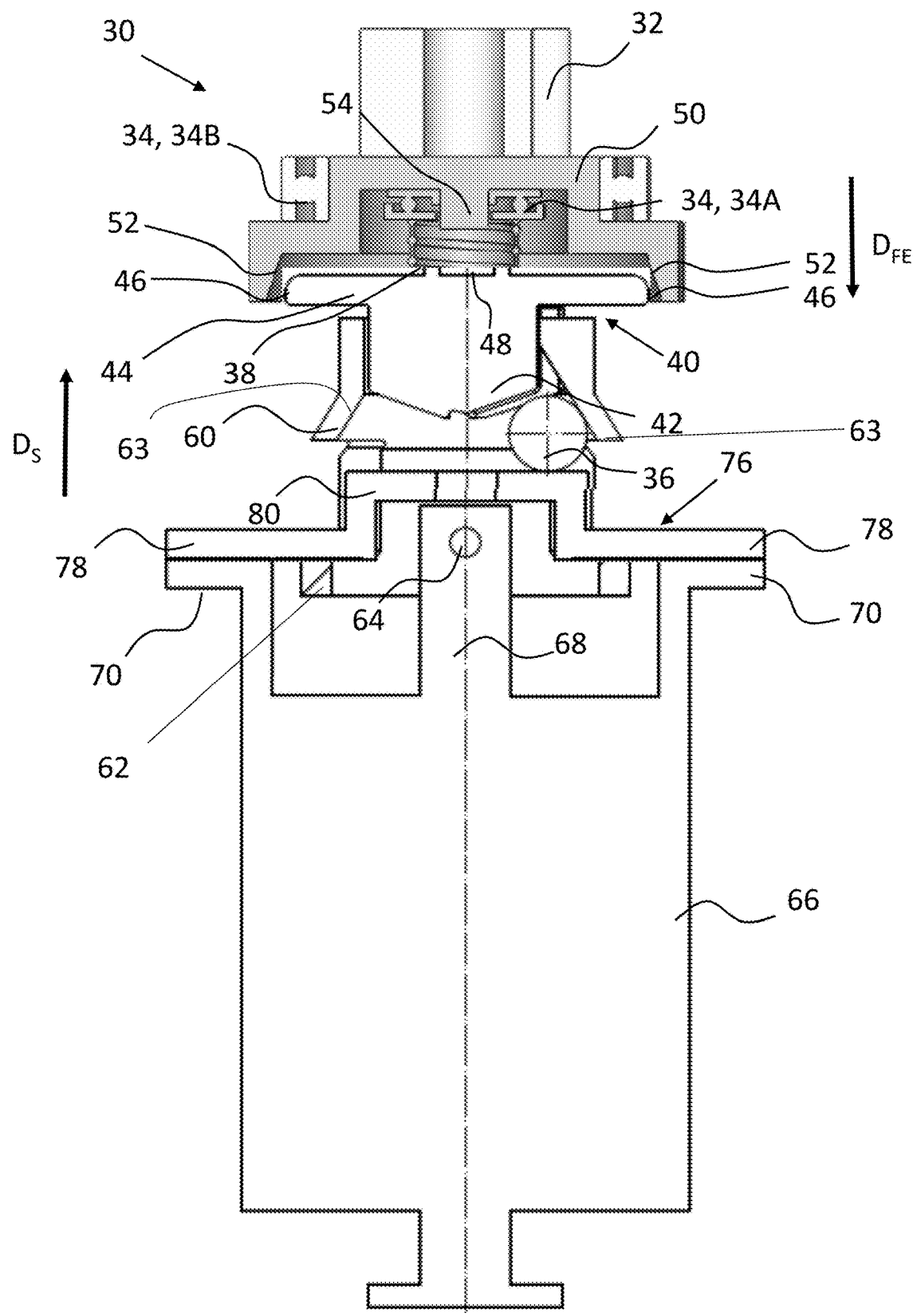
FIG. 3 is a cross-sectional view of a motor brake in a disengaged position.

FIG. 3 illustrates a cross-sectional view of a motor brake 30 in a disengaged position. The motor brake 30 includes a solenoid 66. A plurality of arms 70 of the solenoid 66 are connected to a plurality of legs 78 of a plate 76. A sleeve 60 positioned around the legs 78 of the plate 76 is movably connected to a shaft 68 of the solenoid 66 via a pin 64. When the solenoid 66 moves the sleeve 60 in a direction ($D_S$), a base 80 of the plate 76 and/or the bias features 63 of the sleeve 60 shift a plurality of balls 36 away from a conical portion 42 of an engaging element 40 located within the sleeve 60. The sleeve 60 includes window 61 that the plate 76 extends through and a retaining feature 62 that prevents the sleeve 60 from being removed from the motor brake 30. As the solenoid 66 maintains the disengaged position, the sleeve 60 remains in contact with the plurality of legs 78 of the plate 76. As the plurality of balls 36 moves away from the conical portion 42, a friction surface 46 along an engaging portion 44 of the engaging element 40 moves away in a direction ($D_{FE}$) from an interior tapered surface 52 of a housing 50 integrally formed with a motor gear 32. A biasing member 38 and a thrust bearing 34A are positioned around a protrusion 54 of the housing 50 configured to be received by a cavity 48 of the engaging element 40 in an engaged position. The motor gear 32 directly or indirectly connects to a motor of the brake assembly so that, when the motor brake 30 is disengaged, the motor gear 32 is free to rotate (see FIGS. 1 and 2). The motor brake 30 further includes a radial bearing 34B that encompasses a top portion of the housing 50 and engages a surface of the motor or secondary attachment.

Figure 4:
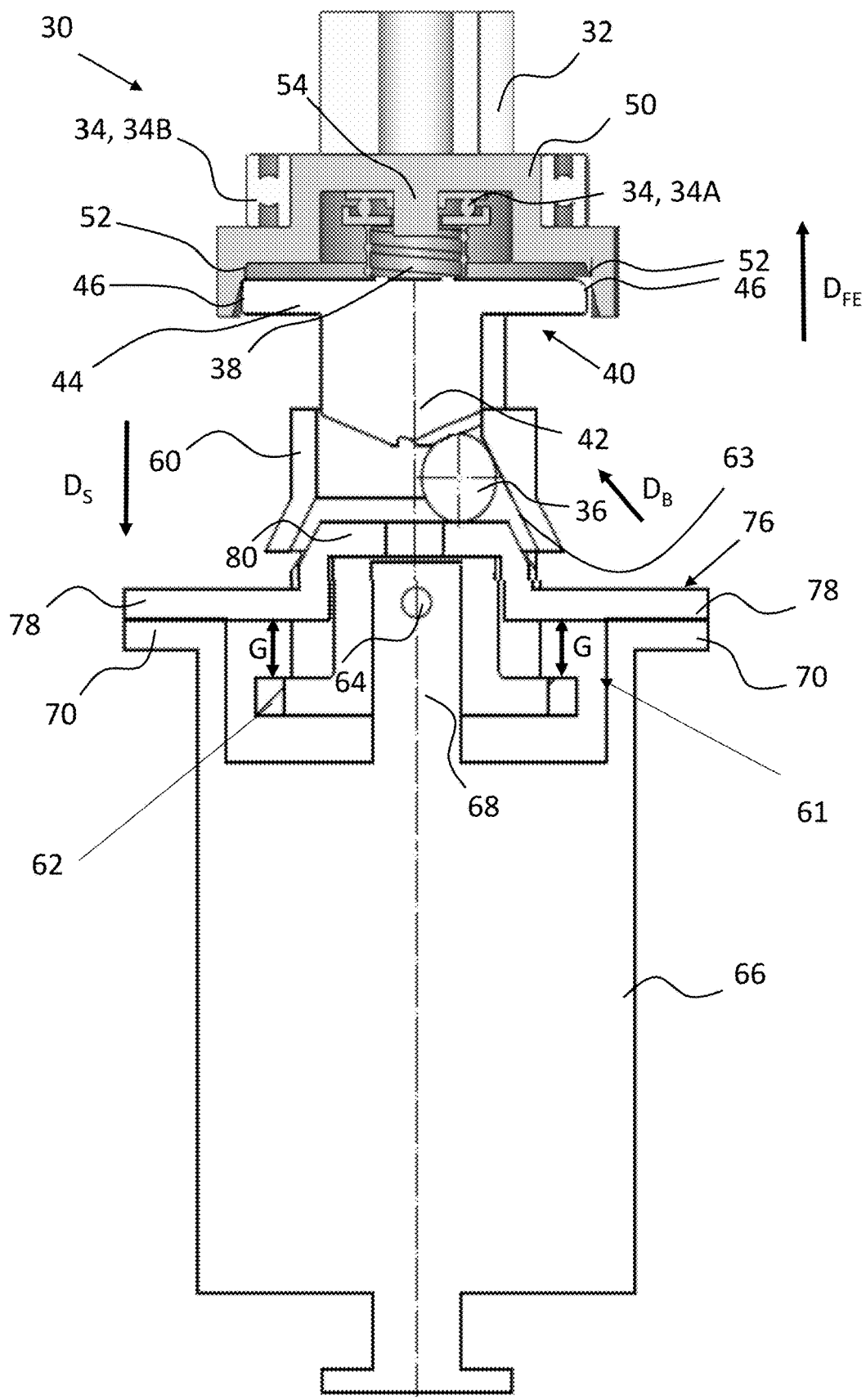
FIG. 4 is a cross-sectional view of a motor brake in an engaged position.

FIG. 4 illustrates a cross-sectional view of a motor brake 30 in an engaged position. The motor brake 30 includes a solenoid 66. A plurality of arms 70 of the solenoid 66 are connected to a plurality of legs 78 of a plate 76. A sleeve 60 includes a window 61 positioned around the legs 78 of the plate 76 and a retaining feature 62 of the sleeve 60 is movably connected to a shaft 68 of the solenoid 66 via a pin 64. When the solenoid 66 moves the sleeve 60 in a direction ($D_S$), a base 80 of the plate 76 shifts a plurality of balls 36 in a direction ($D_B$) into a conical portion 42 of an engaging element 40 located within the sleeve 60. As the solenoid 66 moves the sleeve 60, a gap (G) is formed between the retaining feature 63 of the sleeve 60 and the plurality of legs 78 of the plate 76. As the plurality of balls 36 are moved into contact with the conical portion 42 by the bias features 63 moving the balls 36 inward. As the balls 30 move along the conical portion 42, a friction surface 46 of the engaging element 40 is moved in direction ($D_{FE}$) toward an interior tapered surface 52 of a housing 50 that is integrally formed with a motor gear 32. When the friction surface 46 contacts the tapered surface 52 of the housing 50, a biasing member 38 is compressed so that a protrusion 54 of the housing 50 surrounded by a thrust bearing 34A is received by a cavity of the engaging element 40 (see FIGS. 2A and 3). The motor gear 32 directly or indirectly connects to a motor of the brake assembly so that, when the motor brake 30 is engaged, the motor gear 32 is prevented from rotating (see FIGS. 1 and 2). The motor brake 30 further includes a radial bearing 34B that encompasses a top portion of the housing 50 and engages a surface of the motor or secondary attachment.

Figure 5:
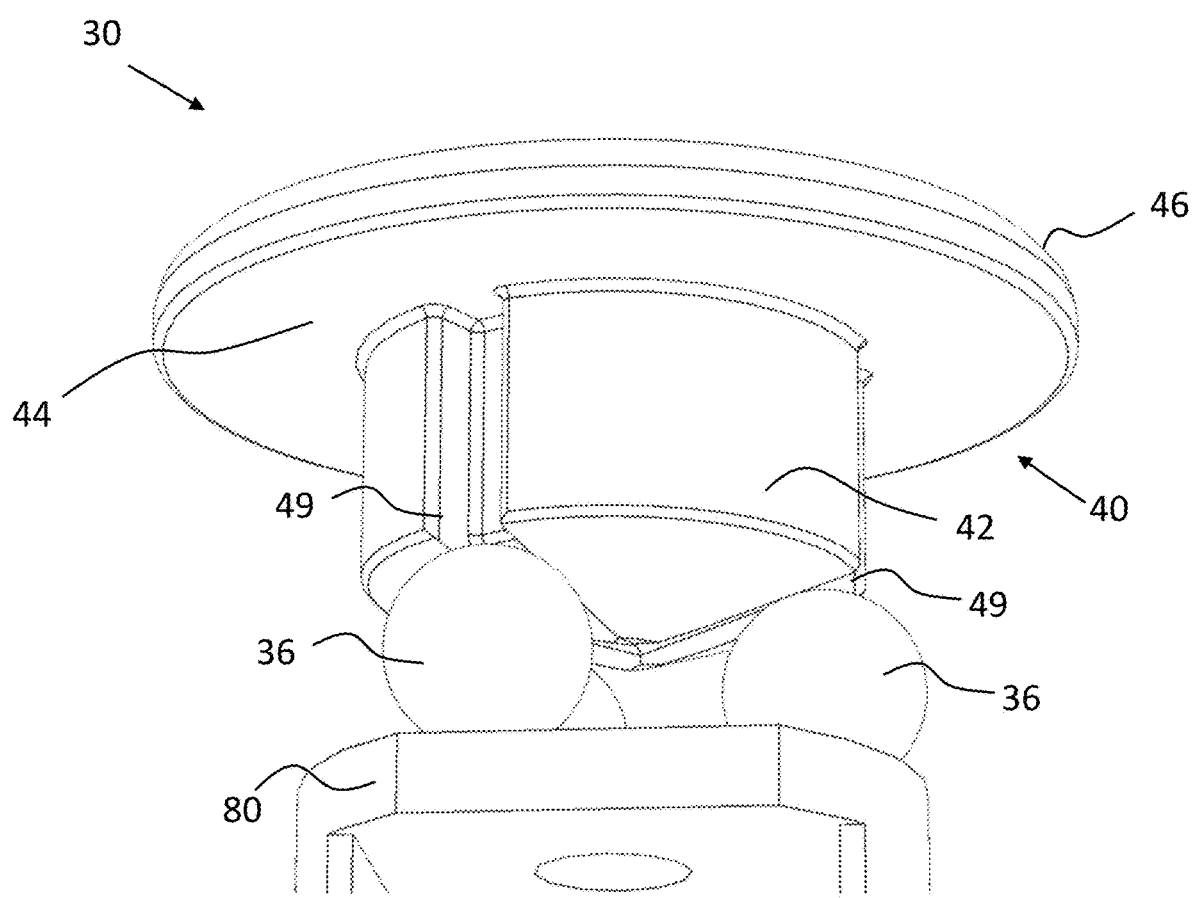
FIG. 5 is a perspective view of a partial motor brake illustrating a friction element and a plurality of balls.

FIG. 5 illustrates a perspective view of a partial motor brake 30. The motor brake 30 includes an engaging element 40 having a conical portion 42 and an engaging portion 44. When a solenoid (not shown) moves a sleeve (not shown) of the motor brake 30, the balls 36 move along a base 80 so that the plurality of balls 36 move into and along a plurality of associated tracks 49 located on the conical portion 42 of the engaging element 40 (see FIGS. 3-4). As the plurality of balls 36 contact the engaging element 40, a friction surface

46 of the engaging portion 44 then engages an interior tapered surface of a housing (see FIGS. 2-4).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

- 2 Brake Assembly
- 4 Motor Gear Unit
- 6 Caliper
- 8 Brake Pads
- 10 Piston
- 12 Piston Bore
- 14 Rotary to Linear Actuator
- 20 Motor
- 30 Motor Brake
- 32 Motor Gear
- 34 Bearing
- 34A Thrust Bearing
- 34B Radial Bearing
- 36 Ball
- 38 Biasing Member
- 40 Engaging Element
- 42 Conical Portion
- 44 Engaging Portion
- 46 Friction Surface
- 48 Cavity
- 49 Track
- 50 Housing
- 52 Tapered Surface
- 54 Protrusion
- 60 Sleeve
- 61 Window
- 62 retaining feature
- 63 Bias feature
- 64 Pin
- 66 Solenoid
- 68 Shaft
- 70 Arm
- 76 Plate
- 78 Leg
- 80 Base
- $D_S$ Direction of Movement (Sleeve)
- $D_{FE}$ Direction of Movement (Friction Element)
- $D_B$ Direction of Movement (Ball)
- G Gap (Between Sleeve and Plate)

I claim:

1. A brake assembly comprising:
   a. a caliper including:
      i. one or more pistons,
   b. one or more rotary to linear actuators that provides an axial force to move the one or more pistons,
   c. a motor gear unit in communication with the one or more rotary to linear actuators, the motor gear unit including:
      i. a motor; and
   d. a motor brake that prevents movement of the motor gear unit, the one or more pistons, or both when the motor is turned off so that a brake apply is maintained, the motor brake including:
      i. a housing
      ii. an engaging element, wherein the engaging element includes a conical portion that is generally cone shaped;
      iii. a sleeve, and
      iv. a solenoid having a shaft extending into the sleeve and connected to the sleeve so that, when the solenoid moves the sleeve by axially moving the shaft connected to the sleeve via a pin extending between the shaft and the sleeve, the engaging element is moved into contact with the housing, thereby creating a braking force.

2. The brake assembly of claim 1, wherein the sleeve moves in a first direction during a brake apply and the engaging element moves in a second direction during a brake apply and the first direction and the second direction are opposite directions.

3. The brake assembly claim 1, wherein a plate extends through a window in the sleeve and the plate assists in connecting the sleeve to the solenoid.

4. The brake assembly of claim 3, wherein the plate includes one or more arms that connect to one or more arms of the solenoid.

5. The brake assembly of claim 3, wherein a plurality of balls are located between the plate and the engaging element.

6. The brake assembly of claim 5, wherein the plurality of balls move along the engaging element as the sleeve moves so that the plurality of balls move the engaging element into contact with the housing.

7. The brake assembly of claim 1, wherein the sleeve includes one or more bias features that move one or more balls toward an axis of the engaging element so that the engaging element is axially moved.

8. The brake assembly of claim 7, wherein the one or more bias features are an annular ring that tapers and narrows as the bias features extend away from the solenoid.

9. The brake assembly of claim 1, wherein the engaging element includes one or more engaging portions on an opposite side of the engaging element as the conical portion.

10. The brake assembly of claim 9, wherein the one or more engaging portions includes a friction surface that contacts the housing to create a braking force to prevent movement of the motor when motor brake is on.

11. The brake assembly of claim 1, wherein a plurality of balls are in contact with the conical portion and as the plurality of balls move towards a peak of the conical portion the engaging element moves towards the housing and as the plurality of balls move away from the peak of the conical portion the engaging element moves away from the housing.

12. The brake assembly of claim 1, wherein the conical portion includes one or more tracks.

13. The brake assembly of claim 12, wherein a ball is located within each of the one or more tracks and the one or more tracks assist in guiding the balls during movement.

14. The brake assembly of claim 1, wherein the housing includes one or more tapered surfaces.

15. The brake assembly of claim 14, wherein the one or more tapered surfaces are in contact with a friction surface of the engaging element when the engaging element and the housing are in contact and in a final engaged position, thereby creating the braking force.

16. A brake assembly comprising:
a. a caliper including:
  i. one or more pistons,
b. one or more rotary to linear actuators that provides an axial force to move the one or more pistons,
c. a motor gear unit in communication with the one or more rotary to linear actuators, the motor gear unit including:
  i. a motor; and
d. a motor brake that prevents movement of the motor gear unit, the one or more pistons, or both when the motor is turned off so that a brake apply is maintained, the motor brake including:
  i. a housing;
  ii. an engaging element that is movable into contact with the housing, wherein the engaging element includes a conical portion that is generally cone shaped;
  iii. a plate
  iv. a sleeve that extends between the engaging element and the plate, and a portion of the engaging element extending into the sleeve;
  v. a plurality of balls located between the plate and the engaging element; and
  vi. a solenoid having a shaft extending into the sleeve and connected to the sleeve by a pin extending through the shaft and the sleeve,
  wherein the solenoid moves the sleeve by axially moving the shaft connected to the sleeve, thereby moving the plurality of balls along the engaging element, and the engaging element is moved into contact with the housing to create a braking force.

17. The brake assembly of claim 16, wherein the sleeve includes one or more bias features that move one or more balls toward an axis of the engaging element so that the engaging element is axially moved.

18. The brake assembly of claim 17, wherein the one or more bias features are an annular ring that tapers and narrows as the bias features extend away from the solenoid.

\* \* \* \* \*